United States Patent
Kaji et al.

(10) Patent No.: US 8,402,524 B2
(45) Date of Patent: Mar. 19, 2013

(54) ID BRIDGE SERVICE SYSTEM AND METHOD THEREOF

(75) Inventors: Tadashi Kaji, Yokohama (JP); Naoki Hayashi, Yokohama (JP); Akifumi Yato, Sagamihara (JP); Shinichi Irube, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 101 days.

(21) Appl. No.: 13/018,975

(22) Filed: Feb. 1, 2011

(65) Prior Publication Data

US 2011/0239284 A1  Sep. 29, 2011

(30) Foreign Application Priority Data

Mar. 12, 2010 (JP) .................... 2010-055938

(51) Int. Cl.
*G06F 7/04* (2006.01)
*G06F 15/16* (2006.01)
*G06F 17/30* (2006.01)
*H04L 29/06* (2006.01)

(52) U.S. Cl. ......................................................... 726/6
(58) Field of Classification Search ................ 726/6, 18, 726/19
See application file for complete search history.

(56) References Cited

U.S. PATENT DOCUMENTS

| 7,610,390 B2 * | 10/2009 | Yared et al. .................. 709/229 |
| 7,784,092 B2 * | 8/2010 | Pearson et al. ..................... 726/8 |
| 2003/0149781 A1 | 8/2003 | Yared et al. |
| 2010/0138899 A1 | 6/2010 | Yamamoto et al. |

FOREIGN PATENT DOCUMENTS

JP  2010-128719  6/2010

* cited by examiner

*Primary Examiner* — Kambiz Zand
*Assistant Examiner* — Dant Shaifer Harriman
(74) *Attorney, Agent, or Firm* — Foley & Lardner LLP

(57) ABSTRACT

An ID bridge service system manages a type and assurance of identity information required for provision of service by an application service system and a type and assurance of identity information managed by plural authentication service systems, and is provided with a selecting measure that selects an authentication service system that manages identity information corresponding to the identity information required for the provision of the service by the application service system out of the plural authentication service systems when a request for authentication is received from the application service system and a requesting measure that requests the selected authentication service system to authenticate.

6 Claims, 13 Drawing Sheets

USER MANAGEMENT DB

```
<User name="alice. smith">
  <serviceProvider name="SP21">
    <birthdate allowedAssuranceLevel=1/>
    <gender allowedAssuranceLevel=1/>
  </serviceProvider>
  <serviceProvider name="SP22">
    <name allowedAssuranceLevel=4/>
    <account allowedAssuranceLevel=4/>
  </serviceProvider>
  <serviceProvider name="SP23">
    <name allowedAssuranceLevel=4/>
    <address allowedAssuranceLevel=4/>
    <mail allowedAssuranceLevel=2/>
  </serviceProvider>
  <serviceProvider name="default"/>

<IDP name="ID31"/>
  <IDP name="ID32"/>
  <IDP name="ID33"/>
</User>
```

SP MANAGEMENT DB

```
<serviceProvider name="SP21">
  <attribute>
    <birthdate requestedAssuranceLevel=1/>
    <gender requestedAssuranceLevel=1/>
  </attribute>
</serviceProvider>
<serviceProvider name="SP22">
  <attribute>
    <name requestedAssuranceLevel=2/>
    <account requestedAssuranceLevel=2/>
  </attribute>
</serviceProvider>
<serviceProvider name="SP23">
  <attribute>
    <name requestedAssuranceLevel=2/>
    <address requestedAssuranceLevel=2/>
  </attribute>
</serviceProvider>
```

IDP MANAGEMENT DB

```
<IDP name="IDP31">
 <Authenthication method="X.509v3"
 defaultAssuranceLevel=4/>
 <Attribute>
    <name defaultAssuranceLevel=4/>
      <address defaultAssuranceLevel=4/>
      <birthdate defaultAssuranceLevel=4/>
      <gender defaultAssuranceLevel=4/>
 </Attribute>
</IDP>
<IDP name="IDP32">
 <Authenthication method="2-factor"
 defaultAssuranceLevel=3/>
 <Attribute>
    <name defaultAssuranceLevel=2/>
    <account defaultAssuranceLevel=2/>
 </Attribute>
</IDP>
<IDP name="IDP33">
 <Authenthication method="password"
 defaultAssuranceLevel=2/>
 <Attribute>
    <name defaultAssuranceLevel=1/>
      <address defaultAssuranceLevel=1/>
    <birthdate defaultAssuranceLevel=1/>
      <gender defaultAssuranceLevel=1/>
      <mail defaultAssuranceLevel=2/>
      <occupation defaultAssuranceLevel=1/>
 </Attribute>
</IDP>
```

FIG. 5A

IDP RELATING TBL

| IDer IN IBP | AUTHENTICATION SERVICE NAME | IDer IN AUTHENTICATION SERVICE |
|---|---|---|
| alice. smith | IDP31 | smith |
| alice. smith | IDP32 | alice |
| alice. smith | IDP33 | a-smith |
| ... | ... | ... |

FIG. 5B

SP RELATING TBL

| IDer IN IBP | APPLICATION SERVICE NAME | IDer IN APPLICATION SERVICE |
|---|---|---|
| alice. smith | SP21 | user001 |
| alice. smith | SP22 | A01 |
| alice. smith | SP23 | smith-a |
| ... | ... | ... |

FIG. 9A

RESULT OF AUTHENTICATION BY IDP31

```
<Assertion>
<AuthenticationStatement AuthenticationMethod="X.509v3" AssuranceLevel=4>
<Subject>
<NameIdentifier SecurityDomain="IDP31" Name="smith"/>
</Subject>
<Attribute AttributeName="name" AssuranceLevel=4>Alice Smith</Attribute>
<Attribute AttributeName="birthdate" AssuranceLevel=4>09/30/1985</Attribute>
<Attribute AttributeName="address" AssuranceLevel=3>Yokohama</Attribute>
<Attribute AttributeName="gender" AssuranceLevel=4>Female</Attribute>
</AuthenticationStatement>
</Assertion>
```

FIG. 9B

RESULT OF AUTHENTICATION BY IDP32

```
<Assertion>
<AuthenticationStatement AuthenticationMethod="2-factor" AssuranceLevel=3>
<Subject>
<NameIdentifier SecurityDomain="IDP32" Name="alice"/>
</Subject>
<Attribute AttributeName="name" AssuranceLevel=2>Smith, Alice</Attribute>
<Attribute AttributeName="account" AssuranceLevel=2>xxxx-xxxx-xxxx-xxxx-xxxx</Attribute>
</AuthenticationStatement>
</Assertion>
```

FIG. 9C

RESULT OF AUTHENTICATION BY IDP31

```
<Assertion>
<AuthenticationStatement AuthenticationMethod="password" AssuranceLevel=2>
<Subject>
<NameIdentifier SecurityDomain="IDP33" Name="a-smith"/>
</Subject>
<Attribute AttributeName="name" AssuranceLevel=1>Alice Smith</Attribute>
<Attribute AttributeName="birthdate" AssuranceLevel=1>09/30/1989</Attribute>
<Attribute AttributeName="address" AssuranceLevel=1>Yokohama</Attribute>
<Attribute AttributeName="gender" AssuranceLevel=1>Female</Attribute>
<Attribute AttributeName="mail" AssuranceLevel=2>smith@hitachi.com</Attribute>
<Attribute AttributeName="occupation" AssuranceLevel=1>Student</Attribute>
</AuthenticationStatement>
</Assertion>
```

FIG. 10

SYNTHETIC IDENTITY INFORMATION

```
<Assertion>
<AuthenticationStatement AssuranceLevel=2>
<Subject>
<NameIdentifier SecurityDomain="SP21" Name="user001"/>
</Subject>
<Attribute AttributeName="birthdate" AssuranceLevel=1>09/30/1989</Attribute>
<Attribute AttributeName="address" AssuranceLevel=1>Yokohama</Attribute>
</AuthenticationStatement>
</Assertion>
```

ID BRIDGE SERVICE SYSTEM AND METHOD THEREOF

INCORPORATION BY REFERENCE

This application claims priority based on Japanese patent application, No. 2010-055938 filed on Mar. 12, 2010, the entire contents of which are incorporated herein by reference.

BACKGROUND

The present invention relates to an identity bridge service system that provides identity information for identifying a user on a network.

Various application services are provided on a network, and authentication information such as a password and personal information which a user should manage to utilize application services is increasing.

To reduce such a load on a user, technique called identity (ID) federation is drawing attention. In the ID federation, an entity called a service provider (SP) provides application service to a user, an entity called an identity service provider (IDP) authenticates the user, and the entity called IDP manages the identity information of the user (an identifier (IDer) for identifying the user and attribute information such as a name and authority). When a user requests SP to provide service, the SP requests IDP to provide identity information so as to judge whether the service is to be provided or not. The IDP authenticates the user and when the authentication succeeds, it provides the identity information to the SP. The SP that receives user information from the IDP provides the service to the user.

In environment of the ID federation, a single sign-on (SSO) function is often provided and when a user is once authenticated by a specific IDP, the user can access to plural IDPs and SPs respectively having trust relationship with the IDP without authentication.

In the environment of the ID federation, however, as the identity information of a user is intensively managed by IDP, the IDP may be able to grasp all personal information of the user.

Then, in US-A1-2003-0149781, a method in which a user stores some of user information to plural IDPs with the user information distributed and the IDP and the SP manage relation between mutual user accounts is disclosed.

The SP acquires required identity information by accessing to one or plural IDPs and collecting attribute information distributed in the plural IDPs. At this time, each IDP judges whether the identity information is to be provided to the SP or not or whether the provision of his/her identity information is to be confirmed by a user or not according to policy set by the user beforehand. Conditions such as "published", "confirmed by a user", "publishable to only SP specified by a user" and "made anonymous" can be set on policy registered in an IDP by the user per identity information piece.

SUMMARY

US-A1-2003-0149781 has a problem that since policy is set in IDPs, policy is required to be set in each IDP when a user manages identity information with the identity information distributed in plural IDPs.

In addition, in US-A1-2003-0149781, when identity information (for example, a name) stored with the identity information overlapped in plural IDPs exists, information which is not to be disclosed may be disclosed to an SP if policy is set by mistake in one IDP. Therefore, there is a problem that a type and policy of identity information registered in each IDP by a user need to be strictly managed.

Further, some IDPs strictly confirm whether a user is the person himself/herself or not using a driver's license, etc. and registers the user, and others that register contents described in electronic mail from a user as they are exist. In addition, information which is transferred contents from a driver's license when a user is registered and information which can be edited by a user also exist as identity information managed by an IDP.

That is, although the assurance of identity information provided by IDPs is not similar, the assurance of an IDP that manages identity information and the assurance of the identity information itself are not considered in US-A1-2003-0149781. Therefore, an IDP may provide SP identity information the disclosure of which a user himself/herself does not desire and the assurance of which exceeds a demand of the SP. Or service may be available by combining identity information different in assurance even when assurance does not meet a demand of SP.

For example, a malicious user may be able to unfairly behave (for example, buy a commodity using a name of another person and ask to deliver it) to SP by registering false identity information (for example, a name) in an IDP which does not strictly confirm whether the user is the person himself/herself or not and combining the identity information with identity information (for example, an address) provided by an IDP which strictly confirms that the user is the person himself/herself.

To solve the problems, an identity bridge service (IBP) system is disclosed that configures trust relationship with plural authentication service systems (IDP) and application service systems (SP) and manages relating user accounts, user policy, a type of identity information managed by each IDP and the assurance of the information.

It is an ID bridge service system that provides identity information required for provision of service by an application service system to the application service system that is concretely disclosed. The ID bridge service system is provided with an SP management database (DB) that manages a type and assurance of first identity information required for the provision of service by the application service system and an IDP management database (DB) that manages types and assurance of identity information managed by plural authentication service systems. The ID bridge service system is also provided with a selecting measure that selects an authentication service system that manages identity information which corresponds to identity information managed in the SP management DB and required for the provision of service by the application service system and which is managed in the IDP management DB out of plural authentication service systems when a request for authentication is received from the application service system and a requesting measure that requests the selected authentication service system to authenticate.

In another example of the ID bridge service system, an application service system specifies a type and the assurance of identity information when the application service system requests authentication, and an ID bridge service system selects an authentication service system which acquires identity information in consideration of not only the requested type of the identity information but the assurance.

In yet another example, an authentication service system also provides information showing the assurance of provided identity information together and an ID bridge service system provides the received identity information to an application service system when the assurance of the identity information acquired from the authentication service system exceeds assurance requested from the application service system.

Yet another example is an ID bridge service system that manages a type and the assurance of identity information the disclosure of which is permitted by a user and selects authentication service only when the user permits the disclosure of identity information requested by an application service system.

Yet another example is an ID bridge service system that selects plural authentication service systems which manage identity information managed in an IDP management database (DB) so that the identity information managed in an SP management database (DB) and managed in the IDP management DB includes identity information required for the provision of service by an application service system when a request for authentication from the application service system is received, requests the selected plural authentication service systems to authenticate and provides identity information required by the application service system out of identity information provided by the plural authentication service systems.

According to the teaching herein, since each IDP manages the assurance of identity information and the IBP adopts identity information provided to the SP which does not exceed assurance requested from the SP when the assurance of identity information acquired from the IDP exceeds the assurance requested from the SP, the IDP can be prevented from providing identity information of assurance which a user himself/herself does not desire to disclose and which exceeds the request of the SP can be prevented to the SP.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 2 shows one example of a user management database (DB) and shows one embodiment of an SP management database (DB) 460 and an ID relating database (DB) 480;

FIG. 3 shows one example of the SP management DB and shows one embodiment of an IDP management database (DB) 470;

FIG. 4 shows one example of the IDP management DB;

FIG. 5A shows one example of an IDP relating table (TBL) of the ID relating DB;

FIG. 5B shows one example of an SP relating table (TBL) of the ID relating DB;

FIG. 9A shows one example of a result of authentication by public authentication service;

FIG. 9B shows one example of a result of authentication by financial authentication service;

FIG. 9C shows one example of a result of authentication by community authentication service;

FIG. 10 shows one example of a result of authentication transmitted by the ID bridge service system.

DETAILED DESCRIPTION OF THE EMBODIMENTS

Figure 1:
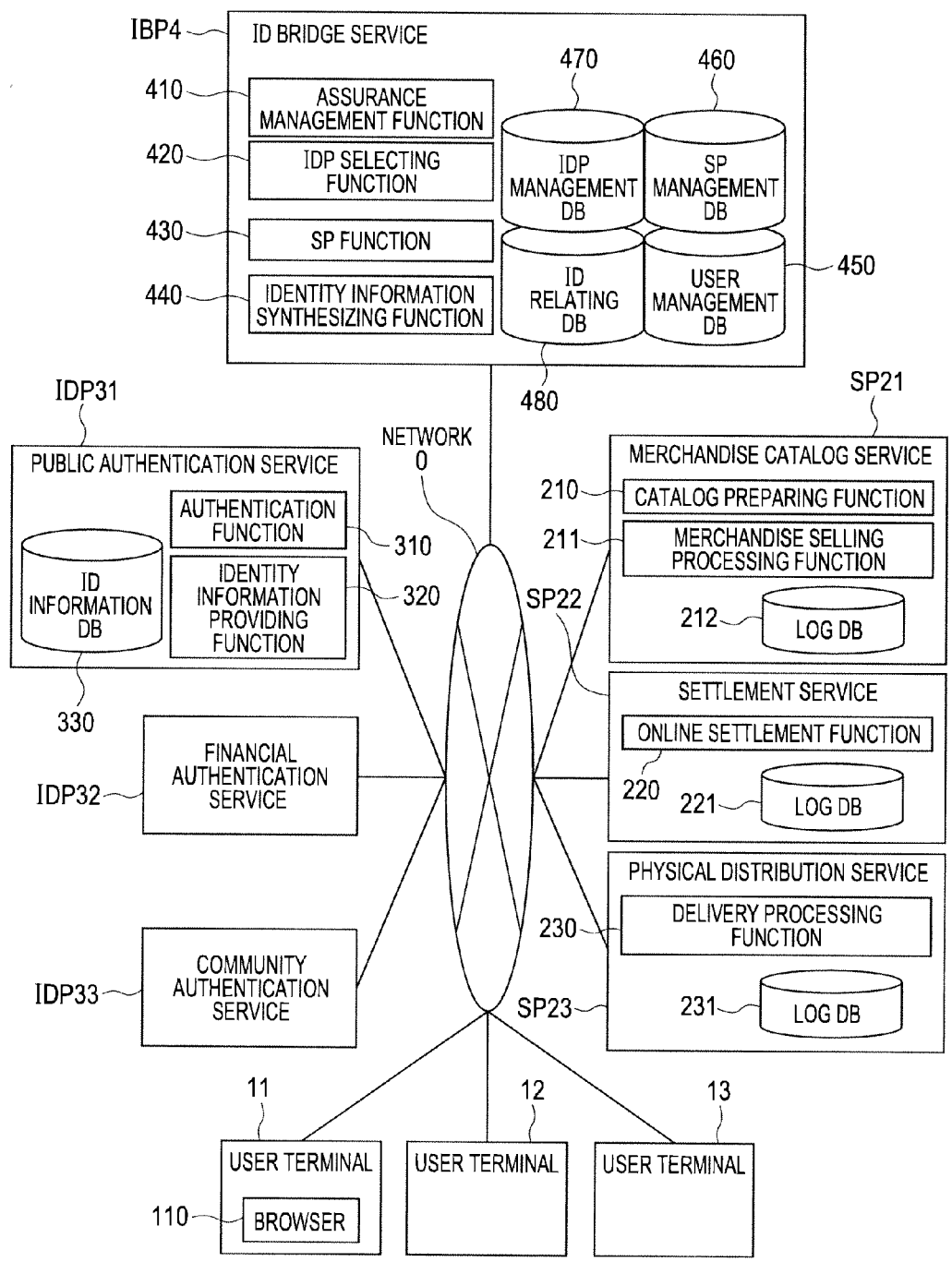
FIG. 1 is a schematic diagram exemplifying online sales service to which identity bridge service is applied.

FIG. 1 is a schematic diagram exemplifying an online sales service system to which identity bridge service equivalent to one embodiment is applied.

The online sales service system shown in FIG. 1 is configured by coupling an ID bridge service IBP4 to user terminals 11, 12, 13, an application service system (catalog service SP21, settlement service SP22, physical distribution service SP23) and an authentication service system (public authentication service IDP31, financial authentication service IDP32, community authentication service IDP33) via a network 0. Hereinafter, each service system is merely called service. In the drawings, it is also similar.

The user terminals 11, 12, 13 are a terminal used for a user to utilize the online sales service and there, a browser 110 for communicating with another service via the network 0 and displaying information for the user is operated.

The catalog service SP21 is service that presents a catalog of merchandise according to the age and the gender of a user for selling a commodity selected by the user and is provided with a catalog preparing function 210 that prepares a catalog of merchandise according to the age and the gender of a user, a commodity selling processing function 211 that executes processing for selling a commodity selected from the catalog by the user in a link with the settlement service SP22 and the physical distribution service SP23 and a log database (DB) 212 that records the age or the gender of the user and the commodity selected by the user.

The settlement service SP22 is provided with an online settlement function 220 for settling a price of a commodity selected by a user in the catalog service SP21 and a log DB221 that stores a record of settlement.

The physical distribution service SP23 is provided with a delivery processing function 230 that takes a procedure for delivering the commodity selected by the user in the catalog service SP21 to the user and a log DB231 that stores a record of delivery.

The public authentication service IDP31, the financial authentication service IDP32 and the community authentication service IDP33 are service that authenticates a user in response to a request from the ID bridge service IBP4 and discloses identity information of the user to the ID bridge service IBP4, and are provided with an authentication function 310 that authenticates a user, an identity information providing function 320 that discloses identity information of the user and an ID information database (DB) 330 that stores the identity information of the user. The authentication function 310, the identity information providing function 320 and the ID information DB 330 respectively with which the financial authentication service IDP32 and the community authentication service IDP33 are provided are not shown in FIG. 1.

The public authentication service IDP31 is authentication service having high assurance that a user is registered after it is verified by matching with an identification card handed directly at a public institution such as a license, a passport and a resident's card that the user is the person himself/herself, and an address, a name, a birthdate and the gender respectively described in the identification card are managed in the ID information DB 330 as identity information. The authentication function 310 of the public authentication service IDP31 authenticates the user by electronic authentication using a digital certificate stored in the identification card issued by the public institution.

In the meantime, the financial authentication service IDP32 is authentication service having high assurance that a user is registered after it is verified by matching with a certificate handed directly at a financial institution such as a bankbook and a credit card that the user is the person himself/herself, and a name, account information and a security number described in the certificate issued by the financial institution and a password set by the user are managed in the ID information DB 330 as identity information. The authentication function 310 of the financial authentication service IDP32 authenticates the user by the combination of the security number and the password.

Further, the community authentication service IDP33 is authentication service that enables a user himself/herself to freely edit his/her identity information, and an address, a name, age, gender, a mail address, an occupation and a password set by the user are managed in the ID information DB 330 as identity information. The authentication function 310 of the community authentication service IDP33 authenticates the user by the password.

The ID bridge service IBP4 is service that makes the public authentication service IDP31, the financial authentication service IDP32 and the community authentication service IDP33 authenticate a user in response to a request from the application service, edits identity information of the user received from these authentication services, synthesizes identity information required by the application service and provides it. The ID bridge service IBP4 is provided with an assurance management function 410 that manages the assurance of identity information provided by the authentication service, an IDP selecting function 420 that selects the authentication service which acquires identity information required by the catalog service SP21, the settlement service SP22 and the physical distribution service SP23, an SP function 430 that requests the authentication service to authenticate a user and acquires his/her identity information and an identity information synthesizing function 440 that edits the identity information of the user received from these authentication services and synthesizes identity information requested by the application service. In addition, the ID bridge service is provided with a user management database (DB) 450 that manages identity information the provision to each application service of which is permitted by a user and the assurance of the identity information, an SP management database (DB) 460 that manages the identity information of the user requested to disclose it for the provision of the service by each application service and the assurance of the identity information, an IDP management database (DB) 470 that manages an authenticating method which the authentication service provides, the assurance of the authenticating method, a type of identity information held by the authentication service and the assurance of the identity information and an ID relating database (DB) 480 that manages relation between a user registered in the authentication service and the application service and the user registered in the IBP4.

FIG. 2 shows one example of the user management DB 450. The user management DB 450 shown in FIG. 2 includes the description of policy that a birthdate and gender respectively of assurance 1 of a user identified as "alice.smith" in the IBP4 may be disclosed to the catalog service SP21, a name and account information respectively of assurance 4 of the user may be disclosed to the settlement service SP22 and a name and an address respectively of assurance 4 and a mail address of assurance 2 of the user may be disclosed to the physical distribution service SP23. In addition, the user management DB includes description that the user is registered in the public authentication service IDP31, the financial authentication service IDP32 and the community authentication service IDP33.

FIG. 3 shows one example of the SP management DB 460. The SP management DB 460 shown in FIG. 3 includes the description of policy that for the provision of each service, the catalog service SP21 requires the birthdate and the gender respectively of assurance 1, the settlement service SP22 requires the name and the account information respectively of assurance 4 and the physical distribution service SP23 requires the name and the address respectively of assurance 4.

FIG. 4 shows one example of the IDP management DB 470. The IDP management DB 470 shown in FIG. 4 shows that the public authentication service IDP31 provides authentication (X.509v3) by a digital certificate of assurance 4 and manages a name, an address, a birthdate and gender respectively of assurance 4, the financial authentication service IDP 32 provides two (2)-factor authentication of assurance 3 and manages the name and account information respectively of assurance 2, and the community authentication service IDP33 provides password authentication of assurance 2 and manages the name, the address, the birthdate, the gender and occupation respectively of assurance 1 and a mail address of assurance 2.

FIGS. 5A and 5B show one example of the ID relating DB 480. The ID relating DB 480 manages relation by two tables: an IDP relating table (TBL) shown in FIG. 5A that stores correspondence between an identifier (IDer) of user in the ID bridge service IBP4 and IDer in each authentication service; and an SP relating table (TBL) shown in FIG. 5B that stores correspondence between the IDer in the IBP4 and IDer in each application service. The IDP relating TBL shows that a user identified as "alice.smith" in the ID bridge service IBP4 is registered as "smith" in the public authentication service IDP31, as "alice" in the financial authentication service IDP32 and as "a-smith" in the community authentication service IDP33. The SP relating TBL shows that the user is registered as "user001" in the catalog service SP21, as "A01" in the settlement service SP22 and as "smith-a" in the physical distribution service SP23.

The operation of the online sales service system shown in FIG. 1 will be described using a case that a user identified as "alice.smith" in the IBP4 buys a commodity for an example below.

Figure 6:
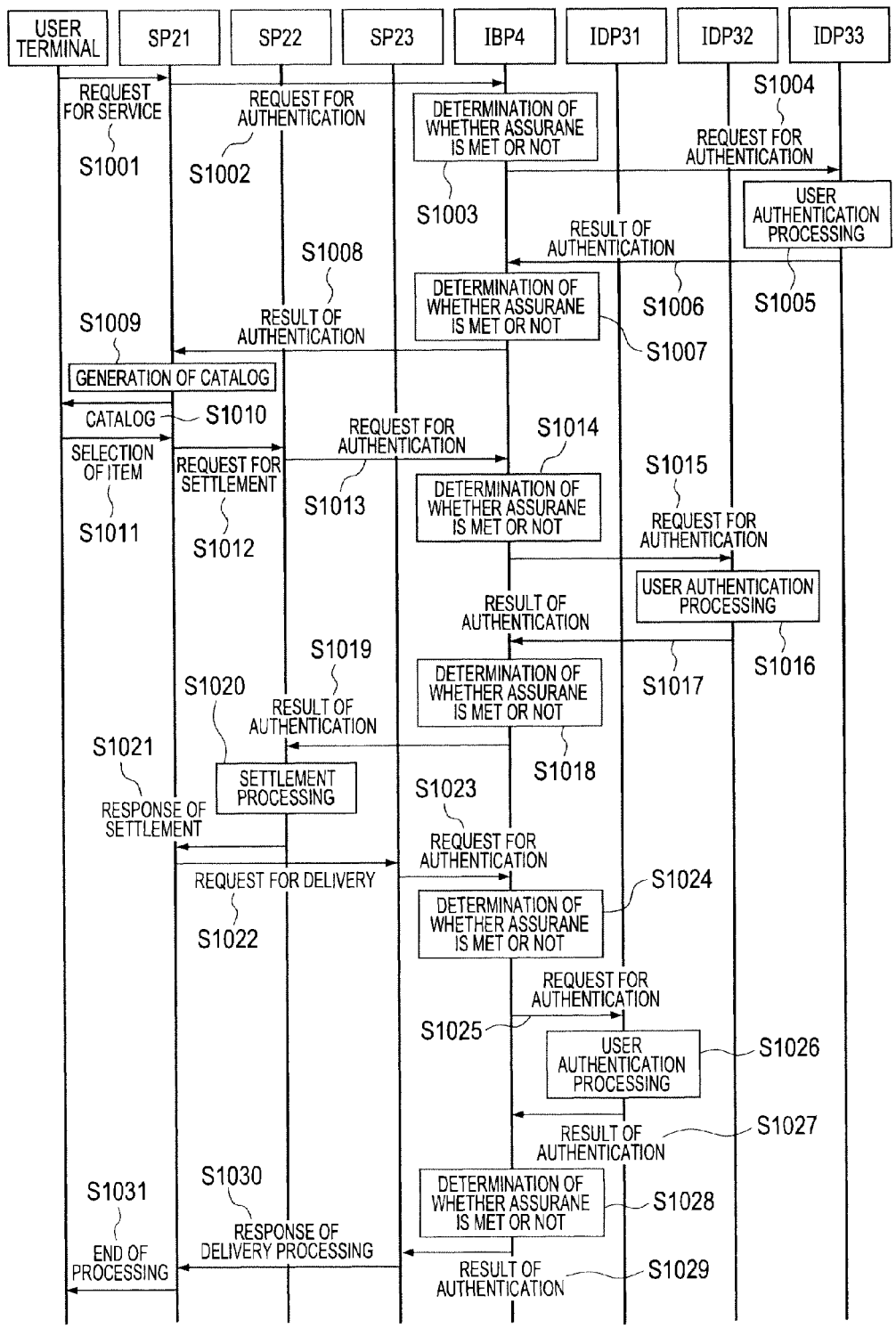
FIG. 6 exemplifies the operation when a commodity is bought of an online sales service system.

FIG. 6 exemplifies the operation when a commodity is bought of the online sales service system shown in FIG. 1.

First, when a user requests the catalog service SP21 to provide service from a user terminal (S1001), the catalog service SP21 requests authentication of the ID bridge service IBP4 (S1002).

FIG. 6 shows that messages are directly exchanged between application service and the ID bridge service IBP4 and between the ID bridge service IBP4 and authentication service. However, for example, messages may also be exchanged via the browser 110 of the user terminal 11 using technique such as Web redirection.

The ID bridge service IBP4 that receives a request for authentication executes a process for determining whether or not assurance is met or not so as to judge whether a user as an object of authentication is authenticated with sufficient assurance and whether or not the user acquires identity information of sufficient assurance (S1003).

Figure 7:
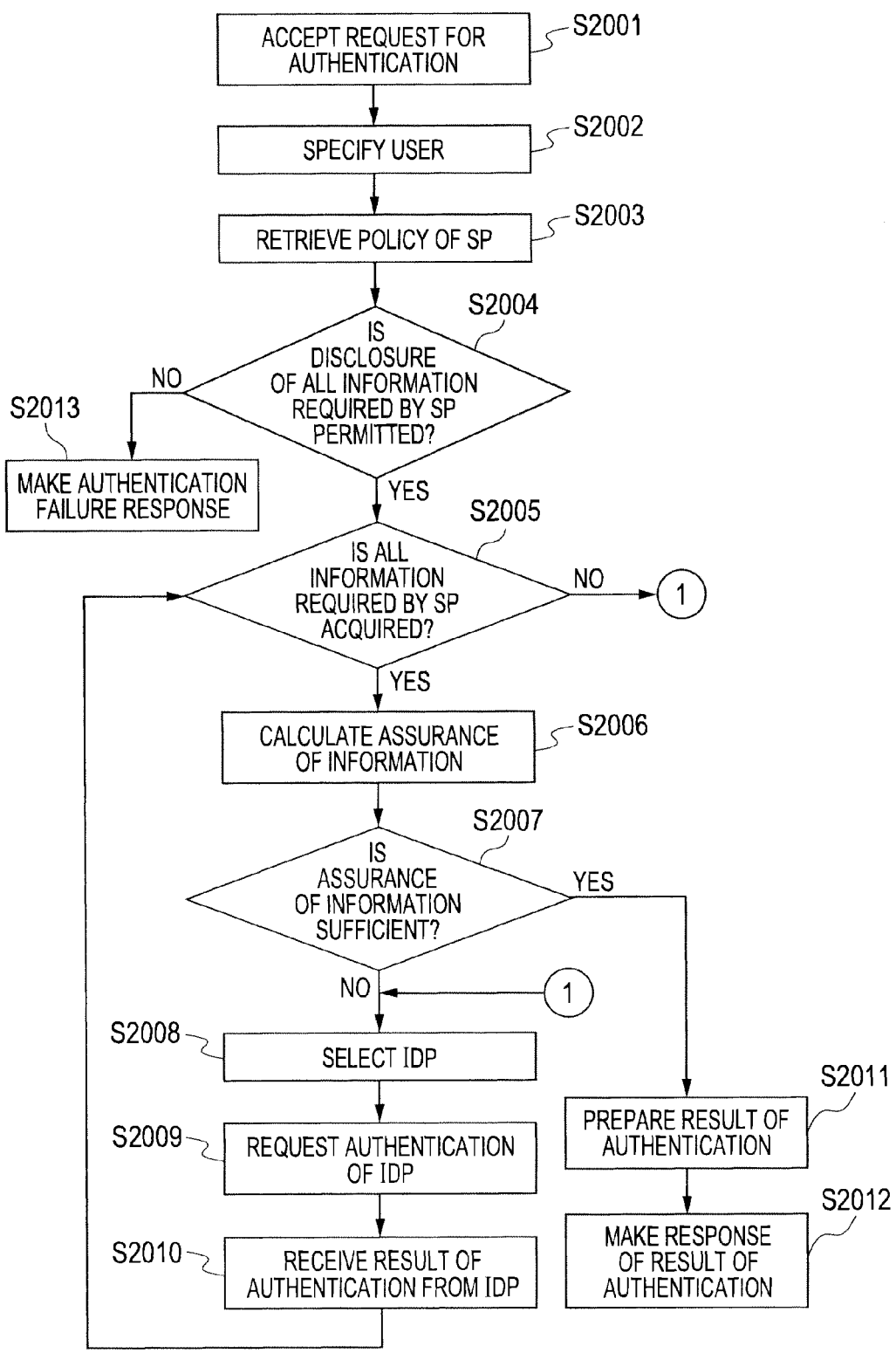
FIG. 7 exemplifies a process for determining whether assurance is met or not by an ID bridge service system.

FIG. 7 exemplifies the process for determining whether assurance is met or not by the ID bridge service IBP4.

The ID bridge service IBP4 specifies a user as an object of authentication depending upon input from the user, HTTP- Cookie and others when the ID bridge service receives a request for authentication (S2001), retrieves the user management DB 450, and acquires policy of the corresponding user (S2002).

Next, the ID bridge service IBP4 retrieves the SP management DB 460 and acquires policy of the application service that transmits the request for authentication (S2003).

Next, the user policy acquired in S2002 and the policy of the application service acquired in S2003 are compared and it is confirmed whether the user permits the application service to disclose information or not (S2004).

In this case, when types of information which the user permits are fewer than types of information which the application service requires or when the assurance of information which the user permits does not exceed the assurance of information required by the application service, it is judged that the disclosure of the information is not permitted, and an error message is prepared and it is responded that authentication failed (S2013).

When it is judged in S2004 that the disclosure of information is not permitted, it is immediately responded that authentication failed in FIG. 7. However, it may also be inquired of the user whether the disclosure of information in shortage may be permitted or not, and it may also be inquired of the application service whether types of information in shortage are not required or not and whether no problem is caused even if assurance is short.

When it is judged in S2004 that the disclosure of information is permitted, the ID bridge service IBP4 determines whether or not the identity information synthesizing function 440 has already acquired all information required by the application service (S2005).

When it is judged in S2005 that all the information required by the application service is already acquired, the assurance of information acquired by the assurance management function 410 is calculated (S2006). In the online sales service system shown in FIG. 1, the assurance of information is calculated using the following expression.

(Assurance added when authentication service provides information)×(Assurance of authentication of user executed by authentication service)÷(Maximum value of assurance of authentication of user)

When the same type of information is provided from plural authentication services, the total of each assurance is calculated as the assurance of information. At this time, when the same type of information is acquired from the plural authentication services and their assurance has different values, it may also be judged that the assurance of the corresponding information is lower than assurance offered by each authentication service.

When the assurance of information is calculated, the assurance of the authentication service itself may also be added as follows.

(Assurance added when authentication service provides information)×(Assurance of authentication of user executed by authentication service)÷(Maximum value of assurance of authentication of user)×(Assurance of authentication service itself)÷(Maximum value of assurance of authentication service)

Next, it is determined whether or not the assurance calculated in S2006 exceeds assurance described in the policy acquired S2003 of the application service (S2007).

When the assurance of all information exceeds the assurance described in the policy of the application service (Yes in S2007), the identity information synthesizing function 440 prepares a result of authentication including synthetic identity information provided to the application service (S2011) and responds to the application service as to the result of authentication (S2012).

In the meantime, when information the assurance of which does not exceed the assurance described in the policy of the application service exists (No in S2007), the IDP selecting function 420 retrieves the IDP management DB 470 and selects the authentication service that manages the information the assurance of which is short (S2008).

At this time, when plural authentication services exist, authentication service that can most easily meet assurance required to provide service is selected.

Next, the SP function 430 requests authentication of the authentication service selected in S2008 (S2009).

The SP function 430 waits for a response of a result of authentication from the authentication service and when the SP function receives the result of authentication, it stores the result of authentication (S2010) and returns control to S2005. At this time, as a user identifier included in the result of authentication is IDer in the authentication service, the SP function retrieves the ID relating DB 480, relates the ID with IDer in the corresponding ID bridge service IBP4, and stores it.

When it is judged that the identity information synthesizing function 440 does not acquire all information required by the application service (No in S2005), control is also jumped to S2008, authentication service is selected, and processing for requesting authentication is executed.

The process for determining whether assurance is met or not of the ID bridge service IBP4 has been described.

As described above, in the process for determining whether assurance is met or not of the ID bridge service IBP4, the application service requests authentication of one or plural authentication services which can provide the information of assurance required to provide service, synthetic identity information including only information required for the provision of the service is generated based upon one or plural results of authentication, and the synthetic identity information is provided to the application service.

In S1003 shown in FIG. 6, since a user is not authenticated yet, the community authentication service IDP33 is selected in S2008 shown in FIG. 7.

Next, the ID bridge service IBP4 requests authentication of the community authentication service IDP33 (S1004).

The community authentication service IDP33 that receives the request for authentication from the ID bridge service IBP4 executes processing for authenticating the user (S1005).

Figure 8:
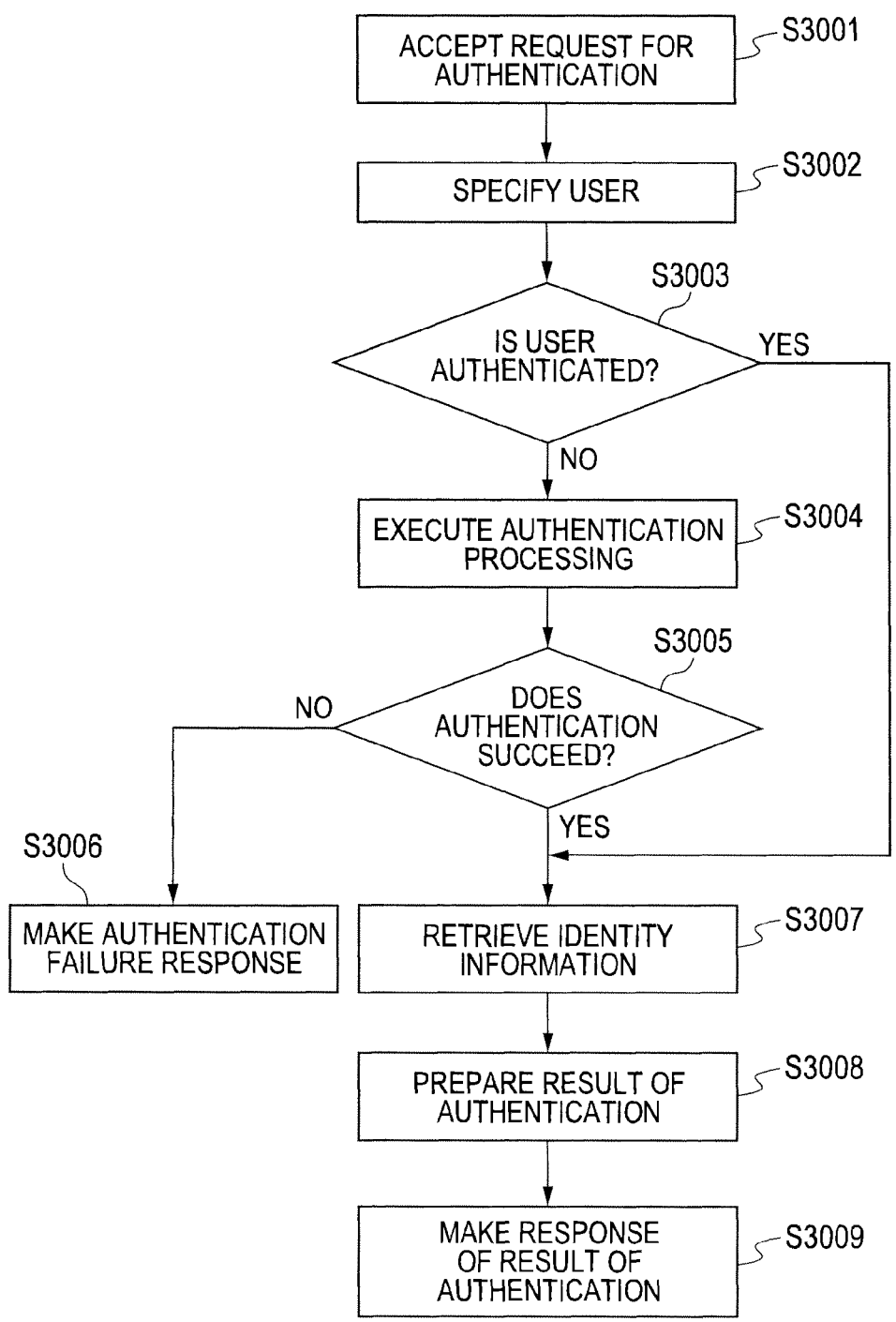
FIG. 8 exemplifies an outline of a user authentication process executed by an authentication service system.

FIG. 8 exemplifies a process for authenticating a user executed by the authentication service.

First, when the authentication service receives a request for authentication (S3001), the authentication function 310 specifies a user to be authenticated depending upon input from the user, HTTP-Cookie, etc. (S3002) and determines whether the user is already authenticated or not (S3003).

When a user cannot be specified in S3002, it is determined in S3003 that the user is not authenticated.

When the authentication function 310 determines that the user is not authenticated yet (No in S3003), it authenticates the user (S3004). At this time, each authentication service executes authentication using a digital certificate in the case of the public authentication service IDP31, using a password and a security number in the case of the financial authentication service IDP 32 and using a password in the case of the community authentication service IDP33.

When the authentication succeeds (Yes in S3005), the identity information providing function 320 retrieves identity information of the user (S3007), prepares a result of authentication including the retrieved identity information (S3008), and responds as to the result of authentication (S3009).

When the authentication function 310 determines that the user is already authenticated (Yes in S3003), control is jumped to S3007.

The process for authenticating the user executed by the authentication service has been described.

In S1005 shown in FIG. 6, when the community authentication service IDP33 executes authenticating processing, a result of authentication shown in FIG. 9C as the result of authentication by the community authentication service IDP33 is returned (S1006).

Next, when the ID bridge service IBP4 receives the result of authentication, it executes again the process for determining whether assurance is met or not (S1007).

In S1007, since the information of assurance required by the catalog service SP21 is all acquired, the ID bridge service IBP4 returns a result of authentication shown in FIG. 10 (S1008).

The catalog service SP21 acquires the information of the birthdate and the gender included in the result of authentication, prepares a catalog according to the age and the gender of the user (S1009), and transmits the catalog to the user terminal 11 (S1010).

The user selects a commodity which the user desires to buy from the catalog and transmits a message that the commodity is selected to the catalog service SP21 (S1011).

When the catalog service SP21 receives the message that the commodity is selected from the user terminal 11, the merchandise selling processing function 211 transmits a settlement request message to the settlement service SP22 (S1012).

The settlement service SP22 that receives the settlement request message transmits an authentication request message to the ID bridge service IBP4 (S1013).

The ID bridge service IBP4 that receives the authentication request message executes the process for determining whether assurance is met or not (S1014). In this case, since account information required for settlement is insufficient and the assurance of the information of a name is also insufficient (the assurance is a level 1 though assurance 2 is required), financial authentication service IDP32 that manages the insufficient information is selected and an authentication request message is transmitted (S1015).

The financial authentication service IDP32 authenticates the user (S1016) and responds as to a result of authentication shown in FIG. 9B (S1017).

Next, when the ID bridge service IBP4 receives the result of authentication, it executes again the process for determining whether assurance is met or not (S1018).

In S1018, as all the information of assurance required by the settlement service SP22 is acquired, the ID bridge service IBP4 responds as to a result of authentication including synthetic identity information (S1019).

When the settlement service SP22 receives the result of authentication, it acquires a name and account information included in the result of authentication and when the settlement service executes settlement processing (S1020), it responds to the catalog service SP21 as to settlement (S1021).

The merchandise selling processing function 211 of the catalog service SP21 that receives the response of settlement specifies the commodity for the physical distribution service SP23 and transmits a delivery request message (S1022).

The physical distribution service SP23 that receives the delivery request message transmits an authentication request message to the ID bridge service IBP4 (S1023).

The ID bridge service IBP4 that receives the authentication request message executes the process for determining whether assurance is met or not (S1024). In this case, since the information of an address is also insufficient though a name is acquired in required information, public authentication service IDP31 that manages the insufficient information is selected and an authentication request message is transmitted to the public authentication service (S1025).

The public authentication service IDP33 authenticates the user (S1026) and responds as to a result of authentication shown in FIG. 9A (S1027).

Next, when the ID bridge service IBP4 receives the result of authentication, it stores the result of authentication. At this time, though the information of the name already acquired by the ID bridge service IBP4 is included in the result of authentication from the public authentication service IDP33, since the assurance of the name included in the result of authentication from the public authentication service IDP33 is higher than the assurance of the name which the ID bridge service IBP4 stores, the information of the name described in the result of authentication from the public authentication service IDP33 is stored.

Next, the ID bridge service IBP4 executes the process for determining whether assurance is met or not again (S1028).

In S1028, since all the information of assurance required by the physical distribution service SP23 is acquired, the ID bridge service IBP4 responds as to a result of authentication including synthetic identity information (S1029).

The physical distribution service SP23 that receives the result of authentication executes processing for delivering the commodity and responds to the catalog service SP21 as to the completion of the delivery processing (S1030).

The catalog service SP21 that receives the notice of the completion of delivery processing notifies the user terminal 11 of the completion of the process (S1031).

The operation of the online sales service system shown in FIG. 1 has been described using the case that the user identified as "alice.smith" in the IBP4 buys the commodity.

Next, operation when a user updates information managed in authentication service will be described with an example that the user updates his/her address in the public authentication service IDP31.

Figure 11:
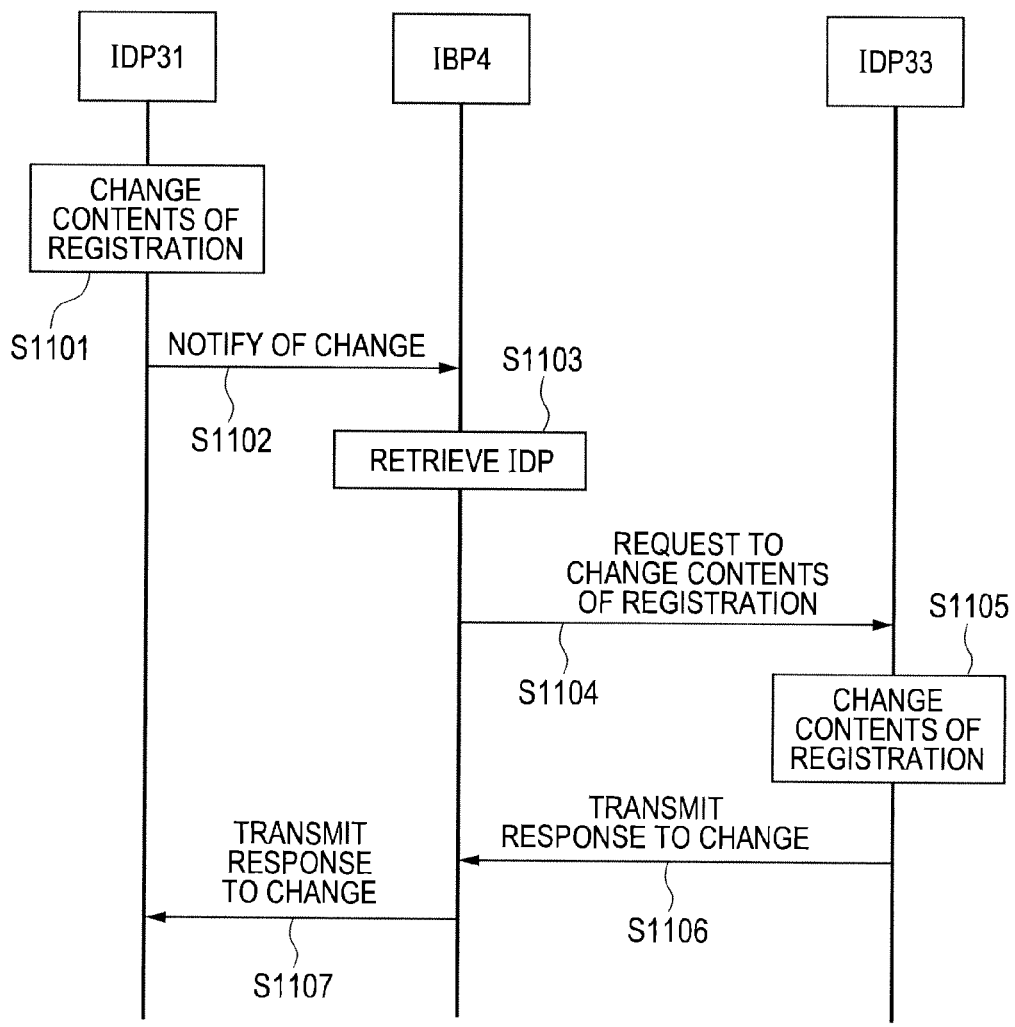
FIG. 11 exemplifies the operation of the online sales service system when a user updates his/her address in a public authentication service system.

FIG. 11 exemplifies the operation of the online sales service system shown in FIG. 1 when the user updates his/her address in the public authentication service IDP31.

When the user updates his/her address in the public authentication service IDP31, the contents of registration managed in the public authentication service IDP31 are changed (S1101).

Next, the public authentication service IDP31 transmits a message for notifying that the information of the user is changed to the ID bridge service IBP4 (S1102).

The IDP selecting function 420 of the ID bridge service IBP4 that receives the notice of the change retrieves IDP that manages the same information (S1103) and finds out that the community authentication service IDP33 manages the same information.

Next, the SP function 430 transmits a message for requesting the community authentication service IDP33 to change the contents of registration to the community authentication service (S1104). The community authentication service IDP33 that receives the request for changing the contents of registration changes the contents (S1105) and transmits a response as to the change to the ID bridge service IBP4 (S1106). The ID bridge service IBP4 that receives the response as to the change transmits a response as to the change to the public authentic service IDP31 (S1107).

The operation of the online sales service system shown in FIG. 1 when the user updates his/her address in the public authentication service IDP31 has been described.

In this embodiment, the identity information synthesizing function stores the result of authentication acquired from the authentication service. However, a result of authentication may also be acquired from the authentication service every time synthetic identity information is prepared.

In addition, it is also possible that application service to which a result of authentication should be provided is disclosed to the authentication service, a result of authentication which the authentication service prepares is encrypted using a public key of the application service, and information acquired by encrypting synthetic identity information is provided. Or application service may also acquire identity information from authentication service. As a result, it is possible to prevent the ID bridge service IBP4 from collecting user information.

According to this embodiment, as an IBP intensively manages the policy of a user, the user has only to manage only one policy even if the user manages identity information with the information distributed in plural IDPs.

In addition, according to this embodiment, since the disclosure of identity information is controlled according to policy managed in an IBP even if the identity information stored in plural IDPs with the information overlapped exists, a type of identity information registered in each IDP does not need to be strictly managed.

Further, according to this embodiment, each IDP manages the assurance of identity information and the IBP adopts identity information provided to the SP which does not exceed assurance requested from the SP when the assurance of identity information acquired from the IDP exceeds the assurance requested by the SP. It is therefore possible to prevent the IDP from providing identity information of assurance which a user himself/herself does not desire to disclose that exceeds the request of the SP and identity information of assurance that does not meet the request of the SP to the SP. Hereby, injustice from combining plural IDPs different in assurance can also be prevented.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. An ID bridge service system comprising one or more computers, the ID bridge service system that provides first identity information required for provision of service by one of a plurality of application service systems, comprising:
    an SP management database (DB) configured to store a type and assurance of the first identity information required for the provision of the service by the one of the plurality of application service systems; and
    an IDP management database (DB) configured to store a type and assurance of second identity information managed by a plurality of authentication service systems,
    the system further configured with:
    a selecting measure configured to select one of the plurality of authentication service systems that manages the second identity information which corresponds to the first identity information stored in the SP management DB and required for the provision of the service by the one of the plurality of application service systems and which is stored in the IDP management DB, out of the plurality of authentication service systems, when a request for authentication is received from the one of the plurality of application service systems; and
    a requesting measure configured to request the selected authentication service system to authenticate.

2. The ID bridge service system according to claim 1, further comprising:
    a user management database (DB) configured to store a type and assurance of third identity information the disclosure of which a user permits,
    wherein the selecting measure is configured to select the authentication service system referring to the user management DB only when the user permits the application service system the disclosure of the second identity information corresponding to the first identity information.

3. The ID bridge service system according to claim 1,
    wherein when the assurance of the identity information received from the selected authentication service system exceeds the assurance of the first identity information requested from the application service system, received identity information is provided to the application service system.

4. An ID bridge service method in which an ID bridge service system is configured to provide first identity information required for provision of service by one of a plurality of application service systems, comprising:
    storing, using an SP management database (DB), a type and assurance of the first identity information required for the provision of the service by the one of the plurality of application service systems; and
    storing, using an IDP management database (DB), a type and assurance of second identity information managed by a plurality of authentication service systems,
    selecting one of the plurality of authentication service systems that manages the second identity information which corresponds to the first identity information stored in the SP management DB and required for the provision of the service by the one of the plurality of application service systems and which is stored in the IDP management DB, out of the plurality of authentication service systems, when the ID bridge service system receives a request for authentication from the one of the plurality of application service systems, and
    requesting the selected authentication service system to authenticate.

5. The ID bridge service method according to claim 4, further comprising:
    storing, using a user management database (DB), a type and assurance of third identity information the disclosure of which a user permits; and
    selecting the authentication service system referring to the user management DB only when the user permits the application service system the disclosure of the second identity information corresponding to the first identity information.

6. The ID bridge service method according to claim 4, further comprising:
    when the assurance of identity information received from the selected authentication service system exceeds the assurance of the first identity information requested from the application service system, providing the received identity information to the application service system.

* * * * *